(12) United States Patent
Shibuya

(10) Patent No.: US 7,120,909 B1
(45) Date of Patent: Oct. 10, 2006

(54) SYSTEM FOR CHANGING A PROGRAM STORED IN A TERMINAL DEVICE AND A TERMINAL DEVICE USED IN THE SYSTEM

(75) Inventor: Toshiyuki Shibuya, Tokyo (JP)

(73) Assignee: NEC Corporation, Tokyo (JP)

( * ) Notice: Subject to any disclaimer, the term of this patent is extended or adjusted under 35 U.S.C. 154(b) by 348 days.

(21) Appl. No.: 09/639,879

(22) Filed: Aug. 17, 2000

(30) Foreign Application Priority Data

Aug. 17, 1999 (JP) ................................. 11-230616

(51) Int. Cl.
*G06F 9/44* (2006.01)
*H04M 3/00* (2006.01)

(52) U.S. Cl. ..................................... 717/172; 455/419
(58) Field of Classification Search ........ 717/168–178; 455/418, 419
See application file for complete search history.

(56) References Cited

U.S. PATENT DOCUMENTS

| 5,297,192 | A | * | 3/1994 | Gerszberg | 455/419 |
| 5,414,751 | A | * | 5/1995 | Yamada | 455/418 |
| 5,594,740 | A | * | 1/1997 | LaDue | 455/410 |
| 5,699,275 | A | * | 12/1997 | Beasley et al. | 709/221 |
| 5,794,142 | A | * | 8/1998 | Vanttila et al. | 455/419 |
| 5,842,216 | A | * | 11/1998 | Anderson et al. | 717/170 |
| 5,848,064 | A | * | 12/1998 | Cowan | 370/338 |
| 5,896,566 | A | * | 4/1999 | Averbuch et al. | 455/419 |
| 5,960,445 | A | * | 9/1999 | Tamori et al. | 717/172 |
| 5,974,312 | A | * | 10/1999 | Hayes et al. | 455/419 |
| 5,987,605 | A | * | 11/1999 | Hill et al. | 713/2 |
| 6,023,620 | A | * | 2/2000 | Hansson | 455/419 |
| 6,237,144 | B1 | * | 5/2001 | Delo | 717/174 |
| 6,263,497 | B1 | * | 7/2001 | Maeda et al. | 717/170 |
| 6,266,810 | B1 | * | 7/2001 | Tanaka et al. | 717/173 |
| 6,301,484 | B1 | * | 10/2001 | Rogers et al. | 455/466 |
| 6,308,061 | B1 | * | 10/2001 | Criss et al. | 455/418 |
| 6,360,364 | B1 | * | 3/2002 | Chen et al. | 711/169 |

(Continued)

FOREIGN PATENT DOCUMENTS

AU 199892417 A1 11/1997

(Continued)

OTHER PUBLICATIONS

British Combined Search and Examination Report, dated Apr. 27, 2001.

(Continued)

*Primary Examiner*—Tuan Dam
*Assistant Examiner*—Eric B. Kiss
(74) *Attorney, Agent, or Firm*—McGinn IP Law Group, PLLC

(57) ABSTRACT

There is provided a system for changing programs stored in a terminal device, including (a) a base station, (b) a program-transferring device which transfers a program to the base station, and (c) a terminal device which downloads a program thereinto from the program-transferring device through the base station, the terminal device including (c1) a memory storing therein at least two programs grouped into at least two groups with respect to a function of a program, and (c2) a management table which stores first data about whether the programs are used or not, and removes a non-used program from the memory. In accordance with the present invention, it is no longer necessary to write all programs into a memory of a terminal device when a function of the terminal device is to be changed. Hence, a function of the terminal device can be changed merely by writing a necessary part of a program into the terminal device, ensuring that a working time can be shortened.

27 Claims, 7 Drawing Sheets

U.S. PATENT DOCUMENTS

| | | | |
|---|---|---|---|
| 6,390,374 B1 * | 5/2002 | Carper et al. | 235/492 |
| 6,496,979 B1 * | 12/2002 | Chen et al. | 717/178 |
| 6,615,404 B1 * | 9/2003 | Garfunkel et al. | 717/173 |
| 6,708,045 B1 * | 3/2004 | Lieu et al. | 455/557 |

FOREIGN PATENT DOCUMENTS

| | | |
|---|---|---|
| DE | 19543843 A1 | 11/1995 |
| EP | 0772367 A2 | 9/1996 |
| GB | 2286095 A | 8/1995 |
| GB | 2301747 A | 12/1996 |
| GB | 2 324 893 | 11/1998 |
| GB | 2 338 574 | 12/1999 |
| JP | 3-158961 | 7/1991 |
| JP | 5-316206 | 11/1993 |
| JP | 7-219780 | 8/1995 |
| JP | 07-225686 | 8/1995 |
| JP | 09-190353 | 7/1997 |
| JP | 9-251714 | 9/1997 |
| JP | 10-326192 | 12/1998 |
| JP | 11-003301 | 1/1999 |
| JP | 11-045182 | 2/1999 |
| JP | 11-096014 | 4/1999 |
| WO | WO 97/16938 | 5/1997 |
| WO | WO 98/38820 | 9/1999 |

OTHER PUBLICATIONS

United Kingdom Search Report dated Mar. 27, 2002.

Japanese Office Action dated Jan. 24, 2003, with partial English translation.

Japanese Office Action dated Jul. 4, 2003 with a partial English translation.

* cited by examiner

SYSTEM FOR CHANGING A PROGRAM STORED IN A TERMINAL DEVICE AND A TERMINAL DEVICE USED IN THE SYSTEM

BACKGROUND OF THE INVENTION

1. Field of the Invention

The invention relates to a system for changing a program stored in a terminal device, and more particularly to such a system which makes it possible for a terminal device to add programs having necessary functions, remove programs having unnecessary functions, and prevent a third party from illegally downloading a program. The invention further relates to a terminal device used in such a system, and a method of changing a program stored in a terminal device.

2. Description of the Related Art

In connection with the above-mentioned terminal device, Japanese Unexamined Patent Publication No. 7-219780 has suggested a system of downloading a program to a terminal device from a center.

However, the system suggested in the Publication is accompanied with a problem that it is impossible to readily add programs having necessary functions and remove programs having unnecessary function. This is because overall functions of the terminal device are constituted as one program. Hence, the program cannot be partially removed. In addition, since it is impossible to make a vacancy in an area in which a program is stored, additional programs cannot be written into the terminal device.

Furthermore, the above-mentioned system is accompanied with a problem that when a user operates the terminal device for downloading a program thereinto, it would not be possible to prevent a third party from downloading a program to a his/her terminal device.

This is because that the above-mentioned system is not provided with a function of security check.

Japanese Unexamined Patent Publication No. 3-158961 has suggested a system of maintaining a software in processors, comprising first processors each equipped in a shop, and a second processor equipped in a center and connected to the first processors through wide area network (WAN). Each of the first processors includes means for storing data about a software stored therein, and means for transferring a file. The second processor includes means for storing latest data bout a software to be stored in the first processors, means for retaining a load module of the software, means for comparing data about a software transmitted from the first processors to the latest data about the software, and transmitting a load module of the software corresponding to a difference between the compared data, to the first processors, and means for transferring a file. On receipt of the data about a software stored in the first processors, the second processor compares the received data to latest data about a software stored in the first processors, which latest data is stored in the second processor, and transmits a load module corresponding to a difference between the compared data, to thereby automatically update a software stored in the first processors.

Japanese Unexamined Patent Publication No. 9-251714 has suggested a system of controlling a use of a software. In accordance with the system, when an application dealing with a plurality of data is to be used, a software provider may restrict a use of the application, cancel restriction for a use of the application, or set the restriction again in response to a user's request.

Japanese Unexamined Patent Publication No. 5-316206 has suggested a system for executing a program downloaded from an exchanger of a parent station to thereby carry out telephone exchange. The system includes a central processing unit having a read only memory in advance storing a program therein, EEPROM downloading additional and revised programs other than the program stored in the read only memory, from a parent station, and storing the programs, a random access memory copying the programs stored in the read only memory and EEPROM, and a micro-processor executing the programs copied by the random access memory. The system does not download all the programs into a remote control exchanger from an exchanger of the parent station, but downloads only the additional and revised programs into the remote control exchanger.

Japanese Unexamined Patent Publication No. 10-326192 has suggested a system of downloading a software program into a CATV terminal device. The system includes a host device and terminal devices. A software program for operating a terminal device, stored in the host device, is downloaded to the terminal device from the host device to thereby update a software program stored in the terminal device. A software program is stored in each of the terminal devices in a predetermined area in the form of a plurality of program parts, by means of a divider which physically partitions an area of a memory equipped in each of the terminal devices. The software program is stored in the host device in the form of program parts corresponding to the program parts of each of the terminal devices. When the program is to be downloaded, only necessary program parts among the software program stored in each of the terminal devices are updated.

However, the above-mentioned problems remain unsolved even by the systems suggested in the above-mentioned Publications.

SUMMARY OF THE INVENTION

In view of the above-mentioned problems, it is an object of the present invention to provide a terminal device which is capable of adding a program, removing a program, and preventing a third party from illegally downloading a program.

It is also an object of the present invention to provide a system of changing programs stored in a terminal device, which system is capable of doing the same.

It is further an object of the present invention to provide a method of changing programs stored in a terminal device, which method is capable of doing the same.

In one aspect of the present invention, there is provided a terminal device including (a) a memory storing therein at least two programs grouped into at least two groups with respect to a function of a program, and (b) a management table which stores first data about whether each of the programs is used or not, and removes a non-used program from the memory.

It is preferable that the memory receives only a necessary program from a program-transferring device, in accordance with the first data.

It is preferable that the terminal device further includes a first device to carry out a program, the first device causing the memory to boot a used program to the first device with reference to the first data, if a check sum of the memory is not coincident with a check sum of the first device, and copying programs stored in the first device into the memory.

It is preferable that the terminal device is a portable one.

There is further provided a terminal device including (a) a first memory storing at least one program therein, (b) a second memory storing both a main program and an application program for carrying out requisite functions, (c) a third memory storing data about the main and application programs in the form of a table, (d) a signal-receiving and -transmitting circuit for receiving a signal from and transmitting a signal to a base station, and (e) a central processing unit which controls an operation of the first to third memories and the signal-receiving and -transmitting circuit.

It is preferable that the third memory stores data about whether the main program is used or not and further whether the application program is used or not.

It is preferable that the third memory stores (a) a program ID of each of the programs, (b) a flag indicating whether each of the programs is used or not, (c) a packet number being transferred from a program-transferring device, (d) a final packet number transferred from a program-transferring device, (e) an initial address of an address in which a program is stored, and (f) a length of a program.

It is preferable that the first memory receives only a necessary program from a program-transferring device, in accordance with the data stored in the third memory.

It is preferable that the second memory causes the first memory to boot a used program to the second memory with reference to the data stored in the third memory, if a check sum of the first memory is not coincident with a check sum of the third memory, and copies programs stored in the third memory into the first memory.

For instance, the first memory may be comprised of an electrically erasable programmable read only memory (EEPROM), the second memory may be comprised of a random access memory (RAM), and the third memory may be comprised of an electrically erasable programmable read only memory (EEPROM).

It is preferable that the terminal device further includes a power source electrically connected to the second memory such that the second memory can keep storing data even when the terminal device is turned off.

In another aspect of the present invention, there is provided a system for changing programs stored in a terminal device, including (a) a base station, (b) a program-transferring device which transfers a program to the base station, and (c) a terminal device which downloads a program thereinto from the program-transferring device through the base station, the terminal device including (c1) a memory storing therein at least two programs grouped into at least two groups with respect to a function of a program, and (c2) a management table which stores first data about whether the programs are used or not, and removes a non-used program from the memory.

It is preferable that the program-transferring device transfers only a necessary program to the first memory in accordance with the first data.

It is preferable that the program-transferring device ciphers a program to be transferred to the terminal device, in response to a password transmitted from the terminal device. For instance, the password may be a serial number or a telephone number of the terminal device.

For instance, the program-transferring device is comprised of (b1) a memory storing a program, (b2) a circuit which encodes the program and transmits the thus encoded program to the base station, and (b3) a controller which controls an operation of the memory and the circuit.

There is further provided a system for changing programs stored in a terminal device, including (a) a base station, (b) a program-transferring device which transfers a program to the base station, and (c) a terminal device which downloads a program thereinto from the program-transferring device through the base station, the terminal device including (a) a first memory storing at least one program therein, (b) a second memory storing both a main program and an application program for carrying out requisite functions, (c) a third memory storing data about the main and application programs in the form of a table, (d) a signal-receiving and -transmitting circuit for receiving a signal from and transmitting a signal to a base station, and (e) a central processing unit which controls an operation of the first to third memories and the signal-receiving and transmitting circuit.

In still another aspect of the present invention, there is provided a method of changing programs stored in a terminal device, including the steps of (a) storing a plurality of programs in groups with respect to a function of a program, and (b) removing a program among the programs from the memory in accordance with data about whether each of the programs is used or not.

There is further provided a method of changing programs stored in a terminal device including a first memory having an area to store a program therein, a second memory having an area to carry out a program therein, and a third memory storing data about whether the program stored in the first memory is used or not, including the steps of (a) calculating a check sum of the first memory, (b) calculating a check sum of the second memory, (c) comparing the check sum of the first memory to the check sum of the second memory, and (d) booting a program from the first memory to the second memory in accordance with data stored in the third memory, if the check sum of the first memory is not coincident with the check sum of the second memory.

The advantages obtained by the aforementioned present invention will be described hereinbelow.

In accordance with the present invention, it is no longer necessary to write all programs into a memory of a terminal device when a function of the terminal device is to be changed. Hence, a function of the terminal device can be changed merely by writing a necessary part of a program into the terminal device, ensuring that a working time can be shortened.

This is because that the terminal device stores both programs in groups with respect to a function of a program and the management table associated with the programs, and hence, the terminal device receives only necessary programs by referring to content of the management table.

In accordance with the present invention, it is possible to prevent a third party from illegally downloading a program. Namely, it is possible to prevent a third party from downloading a program without an object of adding or removing a certain function.

This is because a program is encoded and decoded through the use of an algorithm inherent to the terminal device, when a program is to be downloaded.

In accordance with the present invention, it is possible to remove a program having an unnecessary function, from a memory, ensuring that a vacancy can be obtained in a memory. Hence, additional programs can be readily written into the memory, ensuring that memory resource can be effectively used, and a user can select a function of the terminal device among a plurality of functions with enhanced selectability.

This is because that programs are booted in a packed condition from the first memory to the second memory, and that programs stored in the third memory are copied into the first memory to thereby ensure a vacancy in the first memory.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
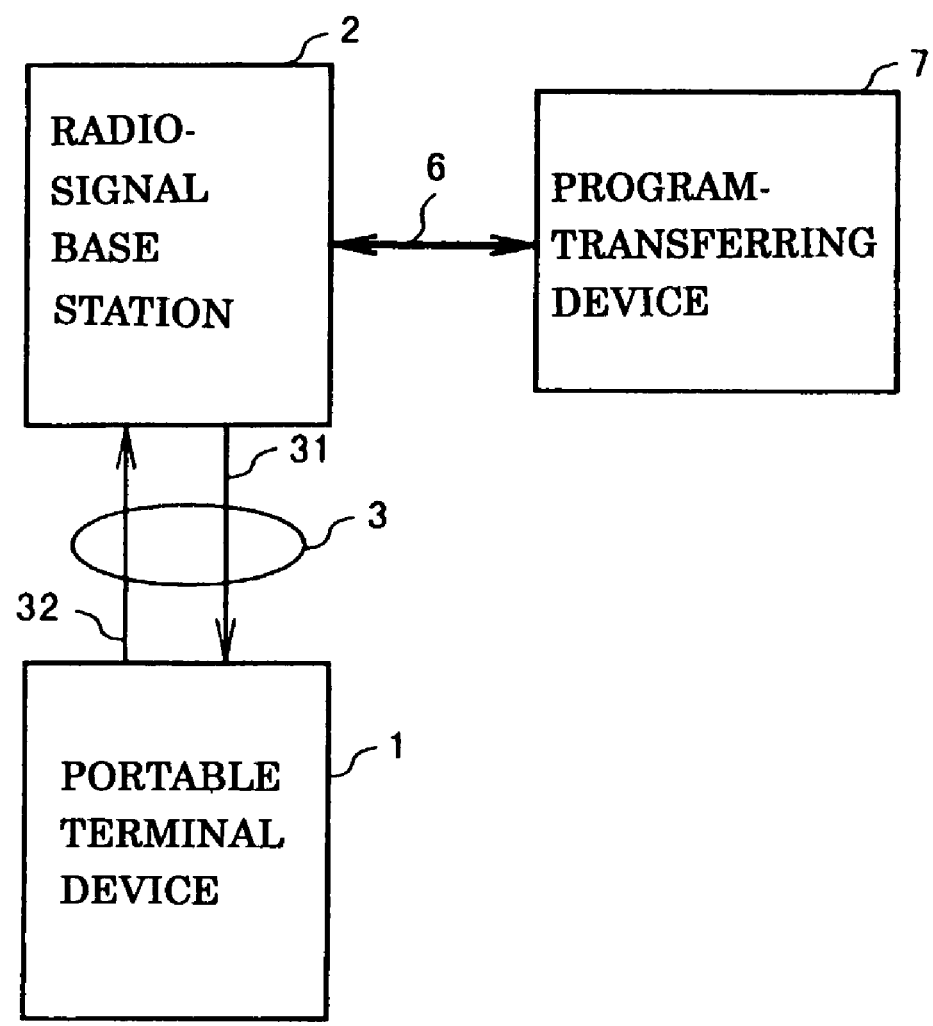
FIG. 1 is a block diagram of a system for changing programs stored in a terminal device, in accordance with the embodiment of the present invention.

FIG. 1 is a block diagram of the system of changing programs stored in a terminal device, in accordance with the embodiment of the present invention.

As illustrated in FIG. 1, the system is comprised of a portable terminal device 1, a radio-signal base station 2, and a program-transferring device 7. The portable terminal device 1 is designed to make interactive communication with the radio-signal base station 2 through a radio-signal interface 3. That is, the portable terminal device 1 can receive data from and transmit data to the radio-signal base station 2 through the radio-signal interface 3. Similarly, the program-transferring device 7 is designed to make interactive communication with the radio-signal base station 2 through a line 6. That is, the program-transferring device 7 can receive data from and transmit data to the radio-signal base station 2 through the line 6.

Figure 2:
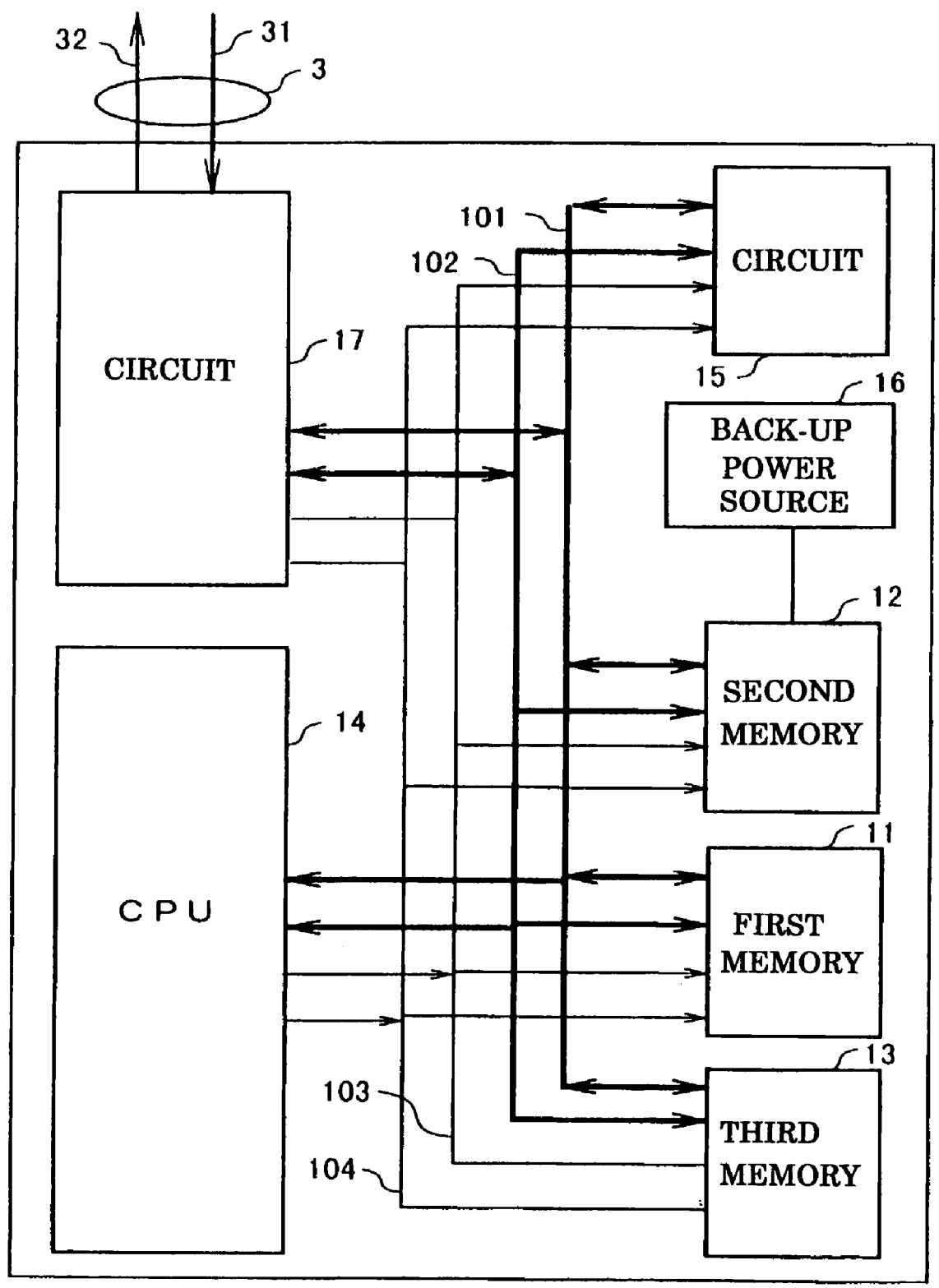
FIG. 2 is a block diagram of the terminal device used in the system illustrated in FIG. 1.

FIG. 2 is a block diagram of the portable terminal device 1. The portable terminal device 1 is comprised of a first memory 11, a second memory 12, a third memory 13, a central processing unit (CPU) 14, functional circuits 15, a back-up power source 16 electrically connected to the second memory 12, and a data receiving and transmitting circuit 17 for receiving and transmitting signals.

The first and third memories 11 and 13 are comprised of a non-volatile memory such as an electrically writable and erasable flush memory or an electrically erasable programmable read only memory (EEPROM).

The first memory 11 acts as a memory for storing programs therein, and stores programs transmitted from the program-transferring device 7 through the radio-signal base station 2.

The second memory 12 is comprised of a volatile memory such as a random access memory (RAM).

The second memory 12 acts as a memory for executing a program therein. The second memory 12 stores a main program and application programs for effecting necessary functions. Since power is supplied to the second memory 12 from the back-up power source 16, data or programs stored in the second memory 12 are kept stored as they are, even when the portable terminal device 1 is turned off.

The functional circuits 15 effects various functions the portable terminal device has. For instance, the functional circuits 15 act as a display unit, a keyboard, a speaker, and so on.

The data receiving and transmitting circuit 17 encodes a signal, and then, transmits the encoded signal to the radio-signal base station 2 through a data up-channel 32, and receives a signal from the radio-signal base station 2 through a data down-channel 31, and then, decodes the received signal.

The central process unit 14 is electrically connected to the first to third memories 11 to 13, the functional circuits 15, and the data receiving and transmitting circuit 17 through both an address bus 101 and a data bus 102.

When the central processing unit 14 reads data out of the first to third memories 11 to 13, a read signal 103 is activated. When the central processing unit 14 writes data into the first to third memories 11 to 13, a write signal 104 is activated.

The data receiving and transmitting circuit 17 decodes a signal received from the radio-signal base station 2 through the data down-channel 31 in accordance with a decoding algorithm obtained by a password inherent to the portable terminal device 1, such as a serial number stored in the portable terminal device 1 or a telephone number of the portable terminal device 1.

The third memory 13 acts as a management table for managing programs. That is, the third memory 13 stores data about the main program and each of the application programs in the form of a table.

In normal operation, the central processing unit 14 reads a program out of the second memory 12, and controls the functional circuits 15 in accordance with the program to thereby realize functions of the portable terminal device 1.

Figure 3:
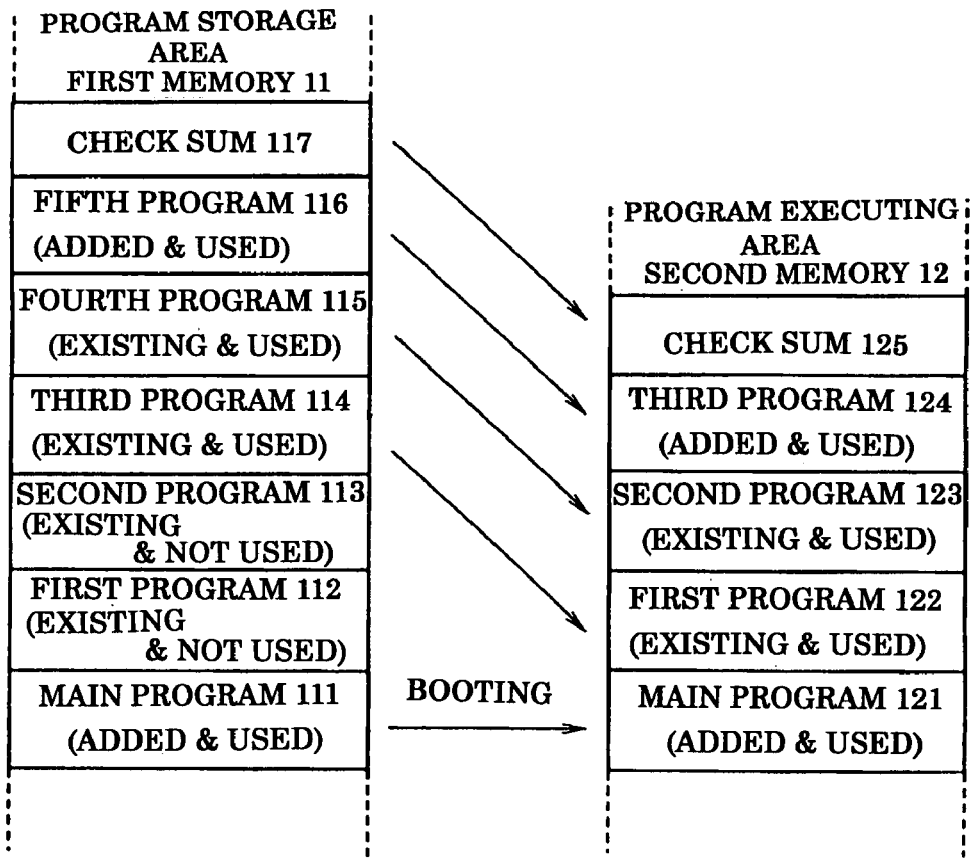
FIG. 3 illustrates programs stored in the first to third memories.
Figure 3:
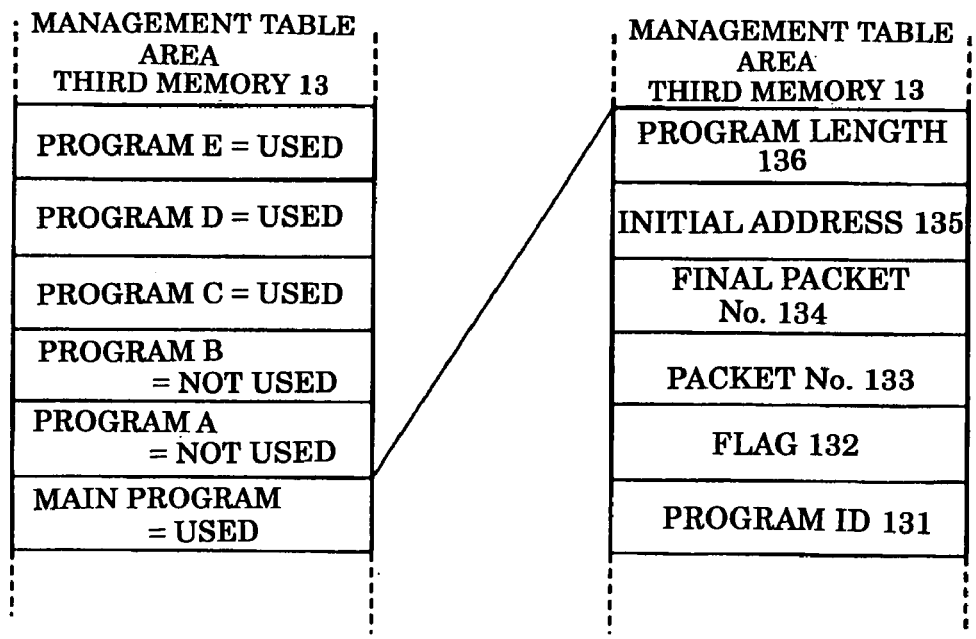

FIG. 3 illustrates what are stored in the first to third memories 11 to 13. As illustrated in FIG. 3, the first memory 11 acting as an area for storing programs therein stores a main program 111 for carrying out task management to each of the application programs, a first program 112 for effecting a first function A as an application program, a second program 113 for effecting a second function B, a third program 114 for effecting a third function C, a fourth program 115 for effecting a fourth function D, a fifth program 116 for effecting a fifth function E, and a check sum 117 storing a check sum value of the first memory 11.

The main program 111 receives instructions from each of the application programs, and controls an operation of circuit blocks constituting the portable terminal device 1.

The second memory 12 acting as an area for executing a program therein stores a main program 121 for carrying out task management to each of the application programs, a first program 122 as an application program for effecting a certain function, a second program 123, a third program 124, and a check sum 125 storing a check sum value of the second memory 12.

The third memory 13 acts as a management table area, that is, acts as a management table for the main program and the application programs stored in the first memory 11. For instance, the management table determines that a main program is to be used, first and second programs A and B are to be not used, and third, fourth and fifth programs C, D and E are to be used.

In accordance with selection made by a user as to whether a specific function is necessary or unnecessary, it would be possible to write only a necessary program into the first memory 11, and remove only an unnecessary program from the first memory 11.

The third memory 13 acting as a management table area stores programs IDs 131 of each of the programs, a flag 132 indicating whether each of the programs is used or not, a packet number 133 being transferred from the program-transferring device 7, a final packet number 134 of a final packet transferred from the program-transferring device 7, an initial address 135 indicative of an area at which a program is stored, and a program length 136.

As explained above, the portable terminal device 1 stores the programs and the management table for each of the programs in groups with respect to a function. Thus, the portable terminal device 1 can receive only necessary programs from the program-transferring device 7 in accordance with the management table.

Figure 4:
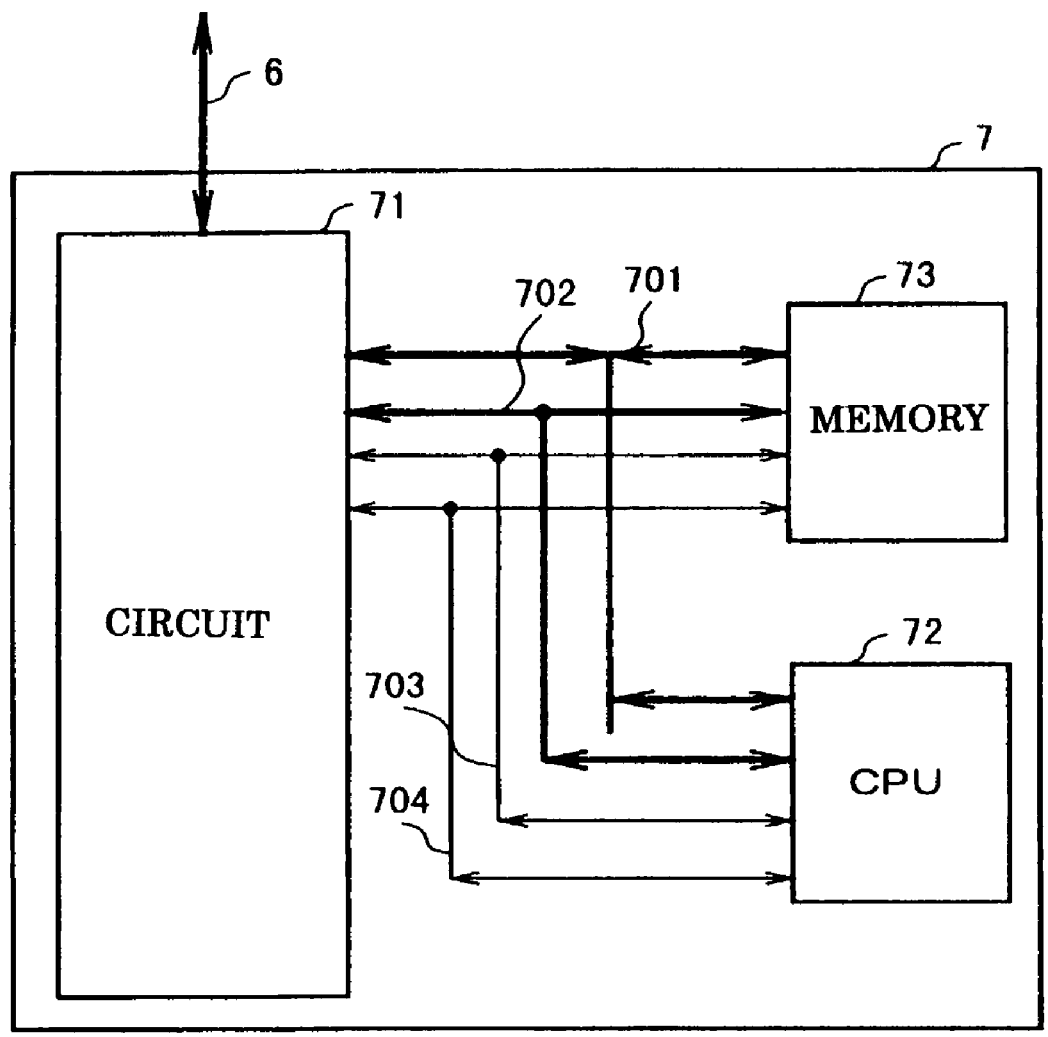
FIG. 4 is a block diagram of the program-transferring device used in the system illustrated in FIG. 1.

FIG. 4 is a block diagram of the program-transferring device 7. As illustrated, the program-transferring device 7 is comprised of a circuit 71 for controlling transfer of a program, a central processing unit 72, and a memory 73.

The circuit 71 transmits data to and receives data from the radio-signal base station 2 through the line 6. The central processing unit 72 is electrically connected to both the circuit 71 and the memory 73 through both an address bus 701 and a data bus 702.

When the central processing unit 72 reads data out of the circuit 71 and the memory 73, a read signal 703 is activated. When the central processing unit 72 writes data into the circuit 71 and the memory 73, a write signal 704 is activated.

The memory 73 is comprised of a randomly accessible memory such as a magnetic disc, for instance. The memory 73 stores a main program and application programs both to be written into the portable terminal device 1, and programs by which the central processing unit 72 effects functions of the program-transferring device 7.

The circuit 71 encodes the programs to be transmitted to the portable terminal device 1, in accordance with an encoding algorithm obtained by a password inherent to the portable terminal device 1, such as a serial number stored in the portable terminal device 1 or a telephone number of the portable terminal device 1, divides the thus encoded programs in a unit of re-transmission, and adds cyclic redundancy check (CRC) bit to the programs in every re-transmission unit.

Figure 5:
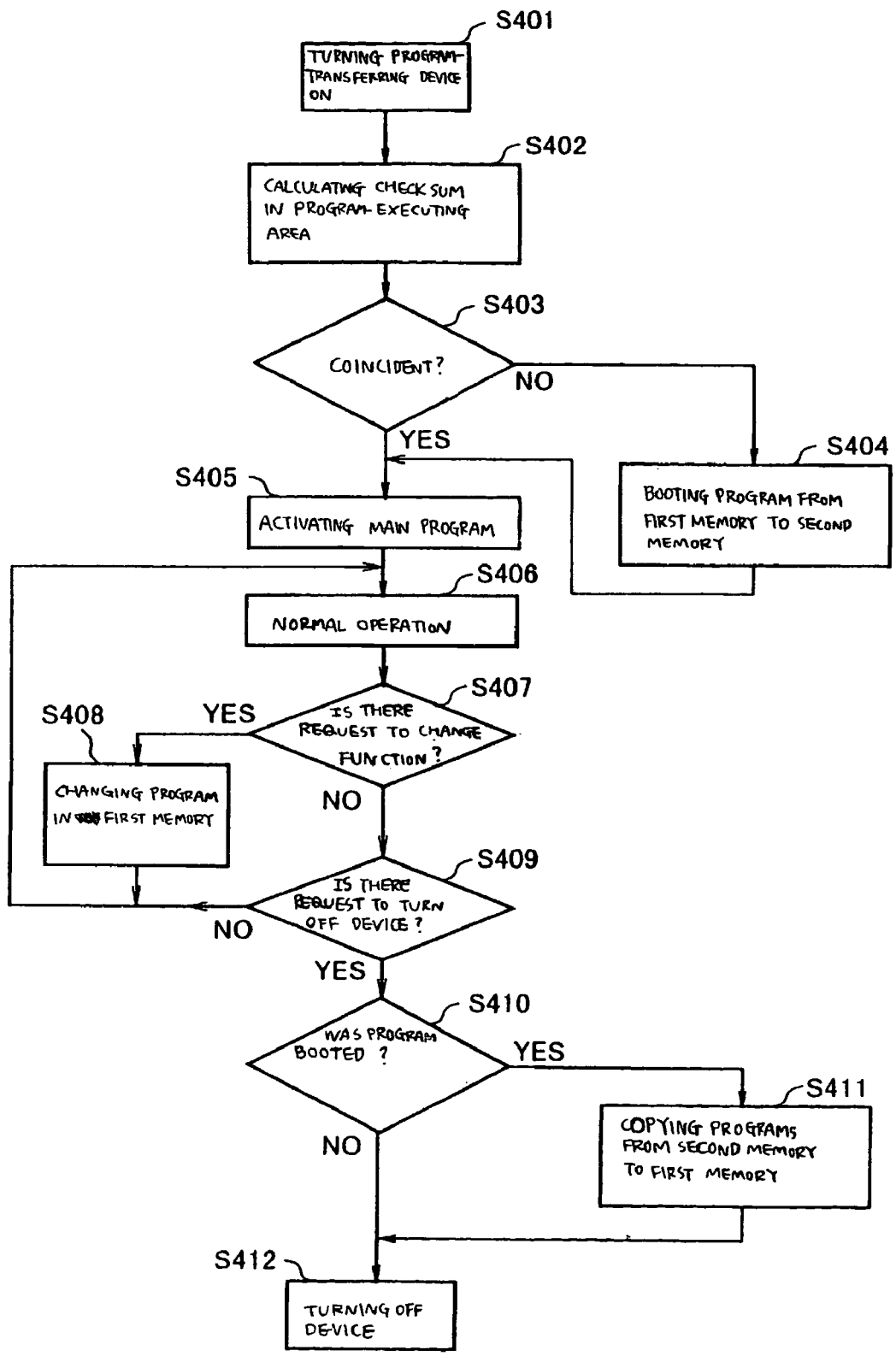
FIG. 5 is a flowchart of a method of changing programs stored in a terminal device, in accordance with the embodiment of the present invention.
Figure 6:
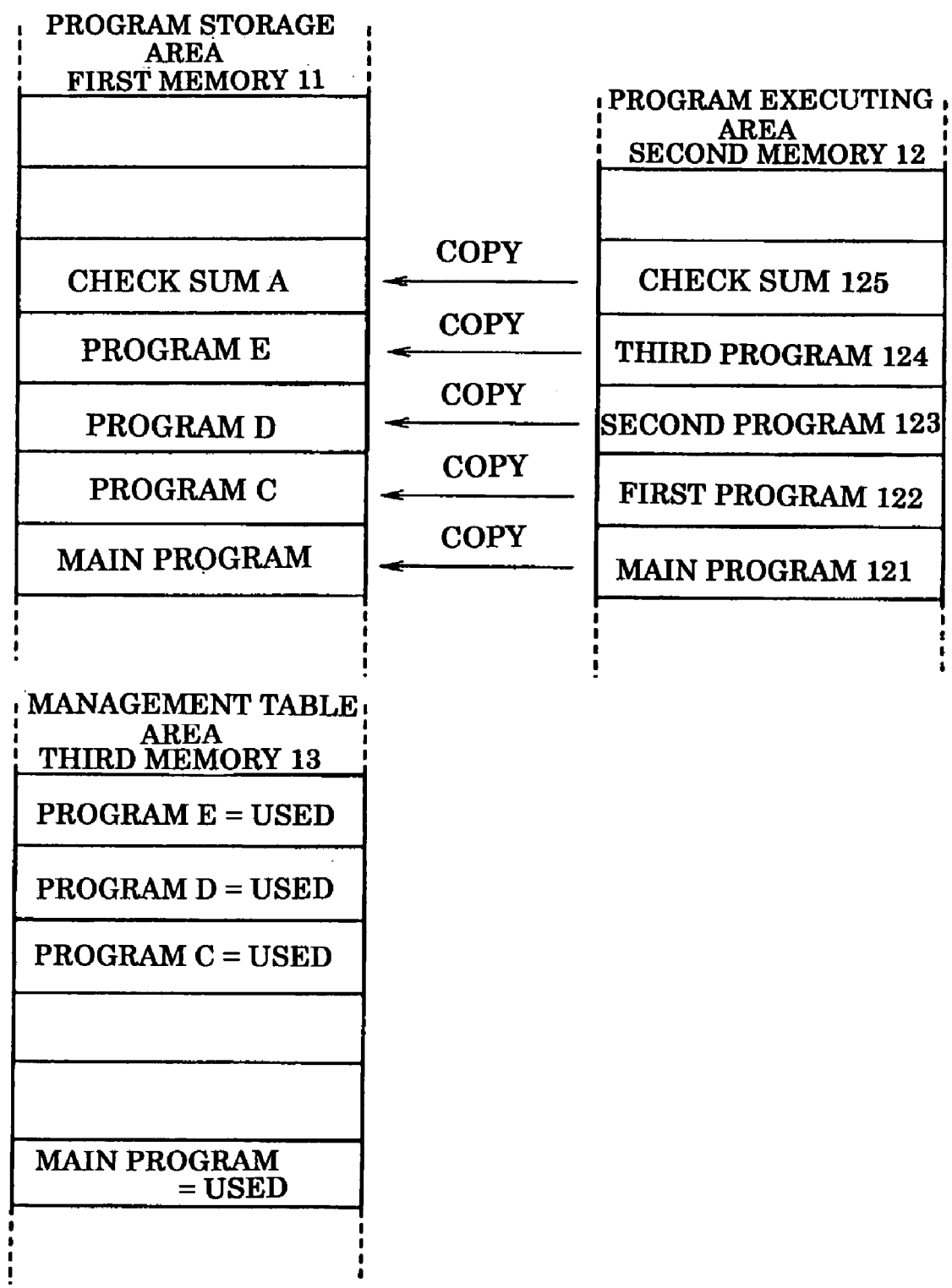
FIG. 6 illustrates programs stored in the first to third memories, when the programs stored in the second memory are copied into the first memory.

FIG. 5 is a flow-chart of a process after a program has been changed until a changed function is activated. FIG. 6 illustrates how the programs stored in the second memory 12 are copied into the first memory 11.

With reference to FIG. 5, the program-transferring device 7 is turned on in step S401.

Then, the central processing unit 14 calculates a check sum value of the program-executing area in the second memory 12, and writes the thus calculated check sum value into the check sum 125 in the second memory 12, in step S402.

Then, the check sum value stored in the check sum 125 in the second memory 12 is compared to a check sum value stored in the check sum 117 in the first memory 11, in step S403.

If the check sums are coincident with each other (YES in step S403), it is deemed that a program is not changed, and hence, the programs stored in the first memory 11 are not booted into the second memory 12.

On the other hand, if the check sums are not coincident with each other (NO in step S403), it is deemed that a program is changed, and hence, the programs stored in the first memory 11 are booted into the second memory 12 in accordance with the flag 132 indicative of whether a program is used or not, stored in the third memory 13, in step S404.

For instance, if the third, fourth and fifth programs 114, 115 and 116 are set to be used and the first and second programs 112 and 113 are set not to be used, the main program 111 is booted to the main program 121, the third program 114 is booted to the first program 122, the fourth program 115 is booted to the second program 123, and the fifth program 116 is booted to the third program 124.

When the check sums are coincident with each other (YES in step S403), the main program 121 is activated in step S405 after the programs stored in the first memory 11 have been booted into the second memory 12.

Then, a normal operation is carried out in step S406.

Then, it is judged in step S407 whether there is a request to change a function of the terminal device 1 during the normal operation, in step S407.

If there is such a request (YES in step S407), the programs stored in the first memory are changed in step S408. Then steps 406 and 407 are carried out again.

If there is not such a request (NO in step S407), it is judged in step S409 whether there is a request to turn off the portable terminal device 1.

If there is not such a request (NO in step S409), steps 406, 407 and 409 are carried out again.

If there is such a request (YES in step S409), it is judged in step S410 whether the programs have been booted to the terminal device 1 when the terminal device 1 was turned on.

If the programs have not been booted (NO in step S410), the portable terminal device 1 is turned off in step S412.

If the portable terminal device 1 is turned off during the normal operation, and further if the programs have been booted during the portable terminal device 1 was on (YES in step S410), it is deemed that a program has been already changed, and the main program 121 and the first to fourth programs 122 to 125 all stored in the second memory 12 are copied into the first memory 11, in step S411. Then, data about the programs A and B are deleted from the management table.

Thus, a change in a function of the portable terminal device 1 is completed.

As mentioned above, the programs are booted to the second memory 12 or the program executing area from the first memory 11 or the program storage area in a packed condition, and the programs stored in the second memory 12 or the program executing area are copied as they are into the first memory 11 or the program storage area. This makes it possible to have a vacancy in the first memory 11. As a result, additional programs can be readily written into the first program 11.

Figure 7:
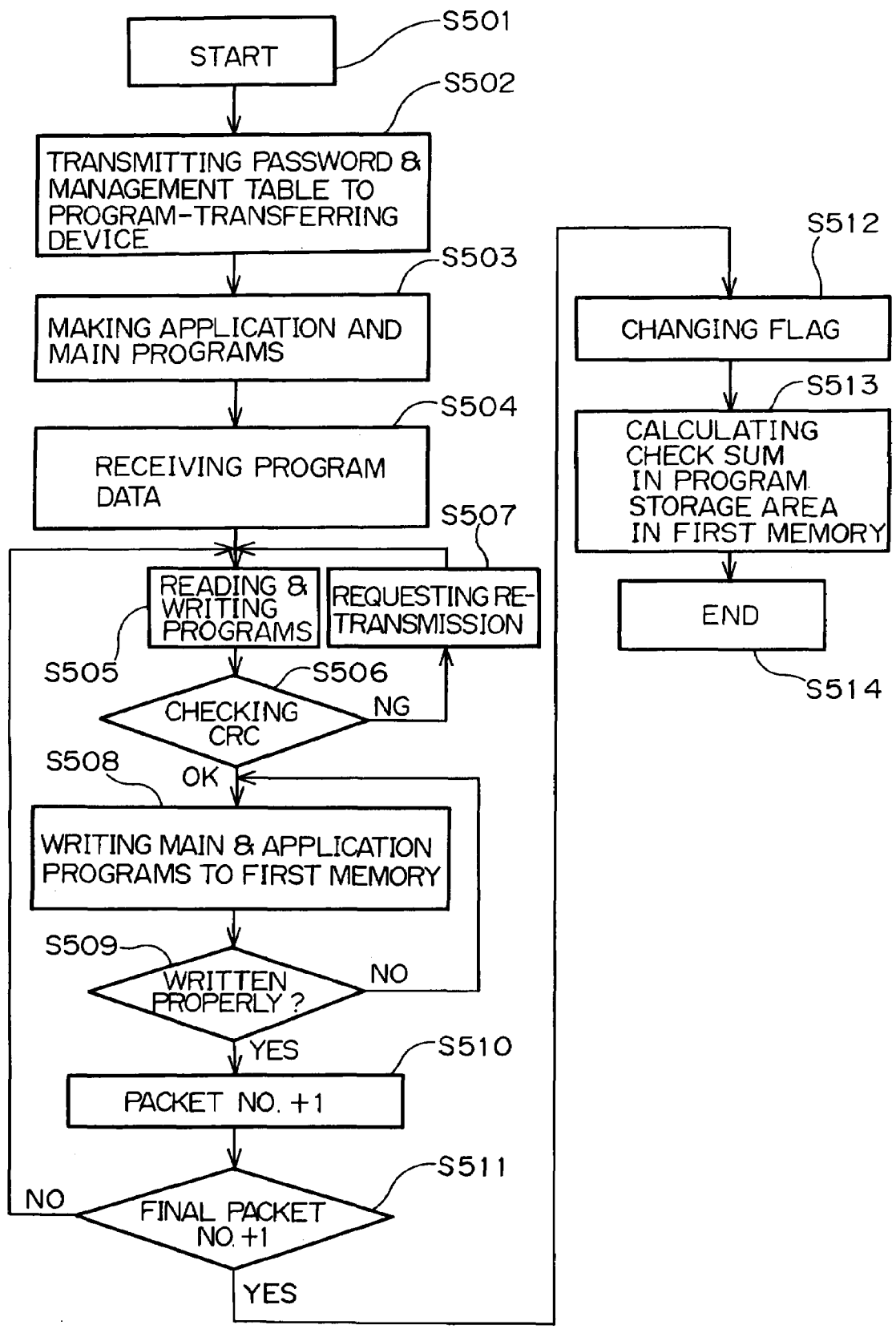
FIG. 7 is a flowchart of a method of changing a function of the terminal device illustrated in FIG. 2.

FIG. 7 is a flow-chart of a process of changing a program stored in the first memory 11, to be carried out in step S408 in FIG. 5. That is, FIG. 7 is a flow-chart of a process of changing a function of the portable terminal device 1.

With reference to FIG. 7, the portable terminal device 1 first makes communication with the program-transferring device 7 through the radio-signal base station 2. Thus, the process of changing a program starts in step S501.

The program-transferring device 7 receives the password, data indicative of what is stored in the management table, and functions to be newly added, from the portable terminal device 1, in step S502.

Then, the program-transferring device 7 makes both an application program to be transmitted to the portable terminal device 1 and a main program corresponding to the existing application program, in step S503.

In step S504, the central processing unit 72 writes the program IDs 131 of the thus made main program and the application program to be added to the terminal device 1, the final packet number 134, and the program length 136 into the circuit 71 as program data. Then, the circuit 71 transmits those program data to the portable terminal device 1 through the radio-signal base station 2.

Then, the central processing unit 72 reads the main program and the application program for providing additional functions, out of the memory 73, and writes the thus read-out programs into the circuit 71, in step S505.

The circuit 71 encodes the main and application programs to be transmitted to the portable terminal device 1, in accordance with an encoding algorithm obtained by the password inherent to the portable terminal device 1, such as a serial number stored in the portable terminal device 1 or a telephone number of the portable terminal device 1, divides the thus encoded programs in a unit of re-transmission, adds cyclic redundancy check (CRC) bit and a packet number to the programs in every re-transmission unit, and transmits the programs to the portable terminal device 1. By encoding the programs through the use of the password, it is possible to apply security check to the programs.

When a function of the terminal device 1 is removed only, only the main program is transmitted to the portable terminal device 1.

On receipt of the program data from the program-transferring device 7 through the radio-signal base station 2, the circuit 17 demodulates the received program data, and the central processing unit 14 makes and stores a management table for the received main program and application program, in the third memory 13.

On receipt of the main and application programs, the circuit 17 decodes those programs in accordance with a decoding algorithm obtained by the password inherent to the portable terminal device 1, such as a serial number stored in the portable terminal device 1 or a telephone number of the portable terminal device 1.

The central processing unit 14 checks CRC in every re-transmission unit of the decoded data, in step S506.

If CRC is not proper (NO in step S506), the central processing unit 14 requests the program-transferring device 7 through the radio-signal base station 2 to transmit the main and application programs thereto again, in step S507.

If CRC is proper (YES in step S506), the main and application programs are written into the first memory 11 in step S508.

Then, the central processing unit 14 judges in step S509 whether the main and application programs are properly written into the first memory 11.

If it is judged that the main and application programs are improperly written into the first memory 11 (NO in step S509), step S508 is carried out again, that is, the main and application programs are written again into the first memory 11.

If it is judged that the main and application programs are properly written into the first memory 11 (YES in step S509), the central processing unit 14 reads out statuses of the first and third memories 11 and 13, and adds one to the packet number 133, in step S510.

Then, in step S511, the central processing unit 14 compares the above-mentioned figure, that is, (the packet number 133)+1, to the figure defined by adding one to the final packet number 134 having been already received, that is, (the final packet number 134)+1.

If the figures are not coincident with each other (NO in step S511), step S505 is carried out again, that is, the circuit 17 receives the main and application programs in the next re-transmission unit.

If the figures are coincident with each other (YES in step S511), the central processing unit 14 judges that the main and application programs have been completely written into the first memory 11, and thus, turns the flag 132 to indicate that the main program in the management table and the added application program are used, in step S512.

Then, the central processing unit 14 calculates a check sum value in the program storage area in the first memory 11, and writes the thus calculated check sum value into the check sum 117, in step S513.

Thus, the program has been completely changed, in step S514.

Hereinbelow is explained an operation of each of the first to third memories 11 to 13 in step S502 in FIG. 7.

For instance, the first program 112 effecting the function A and the second program 113 effecting the function B are both set not to be used.

The third program 114 effecting the function C and the fourth program 115 effecting the function D are set to be used. The existing fifth program 116 effecting the function E is additionally set to be used.

If the first to fifth programs 112 to 116 are set in the above-mentioned manner, the program-transferring device 7 transmits a main program corresponding to the third to fifth programs 114 to 116 and an additional application program to the portable terminal device 1, and the central processing unit 14 writes the received main and application programs into the first memory 11 as the main program 111 and the fifth program 116, respectively, in step S511 in FIG. 7.

The central processing unit 14 calculates check sum values of the main program 111, the third program 114, the fourth program 115, and the fifth program 116 all of which are indicated as being used in the flag 132 in the third memory 13, and writes the thus calculated check sum values into the check sum 117 in the first memory 11, in step S513 in FIG. 7.

Thus, a change in the programs is finished in step S514.

If the program-transferring device 7 can be equipped in the radio-signal base station 2, the system of changing programs stored in a terminal device, in accordance with the embodiment, could have the same functions as mentioned so far in a smaller size.

In addition, even if the portable terminal device 1 is not designed to have the radio-signal interface 3, the system in accordance with the embodiment could have the same functions as mentioned so far, if the portable terminal device 1 is able to be connected to the program-transferring device 7 through a cable.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-230616 filed on Aug. 17, 1999 including specification, claims, drawings and summary is incorporated herein by reference in its entirety.

What is claimed is:

1. A terminal device, comprising:
a memory including:
a program storage area to store at least two programs grouped into at least two groups with respect to overall functions of said terminal device, as supported by said programs, said at least two groups including categorization whether a program is necessary for a change of an overall function to be executed by said terminal device, said program storage area thereby including a to-be-used program and, optionally, a to-be-removed program, according to a selection by a terminal device user to change a current overall function of said terminal device to a new overall function;
a program executing area to store programs for executing said new overall function; and
a memory management table that stores data designating which of any programs in said program storage area are necessary for said new overall function, thereby allowing each said to-be-used program and said to-be-removed program to be identified for said new overall function and allowing said to-be-used program to contain only programs necessary to execute said new overall function, when used in combination with programs already stored in said terminal device for executing said current overall function; and
a controller causing said to-be-used program to be transferred to said program executing area with reference to said data, if a check sum of said program storage area is not coincident with a check sum of said program executing area,
wherein said data allows any of said to-be-removed program to be removed when said new overall function is activated.

2. The terminal device as set forth in claim 1, wherein said to-be-used program is added to said program storage area from a program-transferring device that is external to said terminal device and transferred to said program executing area, in accordance with said data.

3. The terminal device as set forth in claim 1, wherein said terminal device comprises a portable terminal device.

4. A terminal device, comprising:
a program storage area that stores at least one to-be-used program transferred from a base station in response to a selection by a user to change an overall function of said terminal device;
a program executing area that stores a main program and at least one application program, each said at least one application program being necessary for executing device functions of said terminal device and said main program controlling said at least one application program to provide an overall terminal device function selected by a terminal device user;
a memory management table that stores data relative to which application programs are necessary for said overall terminal device functions and which application programs are unnecessary;
a signal-receiving and -transmitting circuit for receiving and transmitting a signal to said base station; and
a central processing unit which controls said program storage area, said program executing area, said memory management table, and said signal-receiving and -transmitting circuit,
wherein a change of overall terminal device functions is achieved by adding any of one or more application programs necessary for a selected new overall terminal device function and a new main program for executing said selected new overall terminal device function, using the added one or more application programs, along with any application programs already stored in said terminal device for a previously-selected function that are also necessary for said selected new overall terminal device function and
wherein said central processing unit causes said program storage area to transfer a to-be-used program to said program executing area with reference to said data stored in said memory management table, if a check sum of said program storage area is not coincident with a check sum of said program executing area.

5. The terminal device as set forth in claim 4, wherein said memory management table stores a program ID of said main program, said application program, and said at least one to-be-used program, a flag indicating whether said main program, said application program, and said at least one to-be-used program is to be used or to be removed, a packet number transferred from a program-transferring device, a final packet number transferred from said program-transferring device, an initial storage address of said main program, said application program, and said at least one to-be-used program, and a length of said main program, said application program, and said at least one to-be-used program.

6. The terminal device as set forth in claim 4,
wherein said program storage area receives said to-be-used program from a program-transferring device, in accordance with said data stored in said memory management table, and
wherein said to-be-used program comprises one of said main program, and said main program and said application program.

7. The terminal device as set forth in claim 4, wherein said program storage area comprises an electrically erasable programmable read-only memory (EEPROM).

8. The terminal device as set forth in claim 4, wherein said program executing area comprises a random access memory (RAM).

9. The terminal device as set forth in claim 4, wherein said memory management table comprises an electrically erasable programmable read-only memory (EEPROM).

10. The terminal device as set forth in claim 4, further comprising a power source electrically connected to said program executing area, such that said program executing area stores data even when said terminal device is turned off.

11. The terminal device as set forth in claim 4, wherein said terminal device comprises a portable terminal device.

12. A system for changing programs stored in a terminal device, said system comprising:
a base station;
a program-transferring device which transfers a to-be-used program to said base station, based on a request from a user to change a function of a terminal device; and
a terminal device which downloads said to-be-used program from said program-transferring device through said base station, said terminal device including:
a memory including:
a program storage area to store said downloaded to-be-used program, according to a selection by a terminal device user; and
a program executing area to store a program for executing said selected function; and a memory management table that stores data related to whether a program is necessary for said selected function, said data permitting:
programs necessary for said selected function to be booted into said program executing area;
programs not necessary for said selected function to be removed from said memory; and
a function of said terminal device to be changed by downloading only program sections necessary to execute a newly selected function, in conjunction with program sections already stored in said terminal device for a previously-selected function,
wherein said terminal device further includes a controller, said controller transferring said to-be-used program to said program storage area with reference to said data, if a check sum of said program executing area is not coincident with a check sum of said program storage area, and copying programs stored in said program storage area into said program executing area.

13. The system as set forth in claim 12,
wherein said program-transferring device transfers said to-be-used program to said program storage area in accordance with said data, and
wherein said to-be-used program comprises one of a main program, and a main program and an application program.

14. The system as set forth in claim 12, wherein said program-transferring device encodes said to-be-used program transferred to said terminal device, in response to a password transmitted from said terminal device.

15. The system as set forth in claim 14, wherein said password comprises one of a serial number and a telephone number of said terminal device.

16. The system as set forth in claim 12, wherein said program-transferring device comprises:
a memory storing a to-be-used program;
a circuit which encodes said to-be-used program and transmits said to-be-used program, which is encoded, to said base station; and
a controller which controls an operation of said memory and said circuit.

17. The system as set forth in claim 12, wherein said terminal device comprises a portable terminal device.

18. A system for changing programs stored in a terminal device, comprising:
a base station;
a program-transferring device which transfers a to-be-used program to said base station in response to a request from a terminal device user to select a function of a terminal device in said system; and
a terminal device which downloads said to-be-used program from said program-transferring device through said base station, said terminal device including:
a program storage area that stores said to-be-used program;
a program executing area that stores programs to execute a selected function of said terminal device; and
a memory management table that stores data designating whether programs are necessary to a function selected by a terminal device user, said data allowing programs for said selected function to be loaded into said program execution area and programs not necessary for said selected function to be removed from a memory of said terminal device, thereby allowing a change in function of said terminal device by adding only program sections necessary for said change in function, as viewed to be in conjunction with programs already stored in said terminal device for a previously-selected function;
a signal-receiving and -transmitting circuit for receiving and transmitting a signal from or to said base station; and
a central processing unit which controls an operation of said program storage area, said program executing area, said memory management table, and said signal-receiving and -transmitting circuit,
wherein said central processing unit causes said program storage area to transfer said to-be-used program to said program executing area with reference to said data stored in said memory management table, if a check sum of said program storage area is not coincident with a check sum of said program executing area.

19. The system as set forth in claim 18,
wherein said program-transferring device transfers only a to-be-used program to said program storage area, in accordance with said data, and
wherein said to-be-used program comprises one of a main program and said main program and an application program.

20. The system as set forth in claim 18, wherein said program-transferring device encodes a to-be-used program transferred to said terminal device, in response to a password transmitted from said terminal device.

21. The system as set forth in claim 20, wherein said password comprises one of a serial number and a telephone number of said terminal device.

22. The system as set forth in claim 18, wherein said memory management table stores data designating whether said main program comprises one of said to-be-used program and said to-be-removed program, and whether said application program comprises one of said to-be-used program and said to-be-removed program.

23. The system as set forth in claim 18, wherein said memory management table stores a program ID of said main program, said application program, and said to-be-used program, a flag indicating whether said main program, said application program, and said to-be-used program is to be used or to be removed, a packet number transferred from a program-transferring device, a final packet number transferred from said program-transferring device, an initial storage address of said main program, said application program, and said to-be-used program, and a length of said main program, said application program, and said to-be-used program.

24. The system as set forth in claim 18,
wherein said program storage area receives only a to-be-used program from said program-transferring device, in accordance with said data stored in said memory management table, and
wherein said to-be-used program comprises one of a main program and said main program and an application.

25. The system as set forth in claim 18, wherein said program-transferring device comprises:
a memory storing a to-be-used program;
a circuit which encodes said to-be-used program and transmits said to-be-used program, which is encoded, to said base station; and
a controller which controls an operation of said memory and said circuit.

26. The system as set forth in claim 18, wherein said terminal device comprises a portable terminal device.

27. A method of changing programs stored in a terminal device including a memory that includes a program storage area to store a to-be-used program transferred from a base station, a program executing area including a plurality of programs, and a memory management table that stores data designating each of said plurality of programs stored in said program executing area as to be used or to be removed, the method comprising:

calculating a check sum of said program storage area that includes the to-be-used program and a to-be-removed program;

calculating a check sum of said program executing area;

comparing said check sum of said program storage area to said check sum of said program executing area; and booting said to-be-used program from said program storage area to said program executing area in accordance with said data stored in said memory management table, if said check sum of said program storage area is not coincident with said check sum of said program executing area.

\* \* \* \* \*